United States Patent
Zick et al.

(10) Patent No.: US 11,258,238 B2
(45) Date of Patent: Feb. 22, 2022

(54) WIRE STRIPPING TOOL

(71) Applicant: Milwaukee Electric Tool Corporation, Brookfield, WI (US)

(72) Inventors: Jonathan A. Zick, Waukesha, WI (US); Wong Wai For, Hong Kong (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 594 days.

(21) Appl. No.: 16/179,614

(22) Filed: Nov. 2, 2018

(65) Prior Publication Data

US 2019/0074672 A1 Mar. 7, 2019

Related U.S. Application Data

(63) Continuation of application No. 13/624,391, filed on Sep. 21, 2012, now abandoned.

(60) Provisional application No. 61/546,614, filed on Oct. 13, 2011, provisional application No. 61/537,692, filed on Sep. 22, 2011.

(51) Int. Cl.
    *H02G 1/12* (2006.01)

(52) U.S. Cl.
    CPC ......... *H02G 1/1265* (2013.01); *H02G 1/1221* (2013.01); *H02G 1/1226* (2013.01); *H02G 1/1236* (2013.01); *Y10T 83/04* (2015.04)

(58) Field of Classification Search
    CPC .......... H02G 1/12; H02G 1/202; H02G 1/204; H02G 1/1221; H02G 1/1224; H02G 1/1226; H02G 1/1234; H02G 1/1231; H02G 1/1236; H02G 1/1239; H02G 1/1202; H02G 1/1204; B25B 7/22
    See application file for complete search history.

(56) References Cited

U.S. PATENT DOCUMENTS

| | | | |
|---|---|---|---|
| 2,401,149 A | 5/1946 | Gordon | |
| 3,816,915 A | 6/1974 | Bieganski | |
| 4,019,409 A | 4/1977 | McKeever | |
| 5,673,486 A * | 10/1997 | Brown | H02G 1/1224 30/90.1 |
| 2010/0269637 A1 | 10/2010 | Wirth | |

FOREIGN PATENT DOCUMENTS

| | | | | |
|---|---|---|---|---|
| GB | 2063580 A * | 6/1981 | ........... | H02G 1/1236 |
| GB | 2288695 A * | 10/1995 | ........... | H02G 1/1221 |

* cited by examiner

*Primary Examiner* — Tyrone V Hall, Jr.
(74) *Attorney, Agent, or Firm* — Michael Best & Friedrich LLP (57) ABSTRACT

A wire stripper operable to strip insulation from a wire, the wire stripper including a battery, a handle portion including a receptacle that receives the battery along a battery insertion axis, a motor, the motor located in the handle portion, the motor including a motor shaft that rotates about a driveline axis. The wire stripper further includes a rotary head coupled to the motor for rotation about a wire insertion axis that is perpendicular to the driveline axis. The rotary head defines a central aperture and the wire insertion axis extends through the central aperture. A blade is coupled to the rotary head for rotation with the rotary head about the wire insertion axis. The blade extends into the central aperture to cut the insulation of the wire passing through the central aperture along the wire insertion axis as the blade rotates about the wire insertion axis.

17 Claims, 9 Drawing Sheets

WIRE STRIPPING TOOL

CROSS-REFERENCE TO RELATED APPLICATION

This application is a continuation of U.S. patent application Ser. No. 13/624,391, filed Sep. 21, 2012, which claims priority to U.S. Provisional Patent Application No. 61/537,692, filed Sep. 22, 2011, and U.S. Provisional Patent Application No. 61/546,614, filed Oct. 13, 2011, the entire contents of which are incorporated herein by reference.

BACKGROUND

The present invention relates to power tools, and in particular, the invention relates to a wire stripper.

Wire strippers are used by electricians and other professionals to separate a short segment of insulation from a wire. Separating the insulation exposes the underlying conductor for making connections. For small gauge wires, a wire stripping pliers, utility knife, or other hand tool is typically used. For larger gauge wires, the insulation layer is typically thicker, more rigid, and more difficult to remove with hand tools. Furthermore, damage may be caused to the underlying conductor when penetrating the insulation layer with a manual cutting tool due to imprecise cutting depth control.

SUMMARY

In one embodiment, the invention provides a wire stripper including a housing defining a receptacle for receiving a battery. A motor disposed in the housing. A rotary head is coupled to the motor for rotation about an axis. The rotary head defines a central aperture along the axis. A blade is coupled to the rotary head for rotation with the rotary head and about the axis. The blade extends at least partially into the central aperture to engage insulation of a wire passing through the aperture.

In another embodiment the invention provides a method of stripping insulation from a wire using a wire stripper, where the wire stripper including a rotary head, a motor, and a blade coupled to the rotary head. A wire is inserted into the rotary head along an insertion axis. The motor is operated in a forward direction to feed the wire into the rotary head along the insertion axis. The blade is engaged with the insulation to strip the insulation from the wire. The motor is operated in a reverse direction to drive the wire out of the rotary head along the insertion axis.

In yet another embodiment, the invention provides a wire stripper having a housing defining a receptacle for receiving a battery. A motor is disposed in the housing. A rotary head is coupled to the motor for rotation about an axis. The rotary head defines a central aperture along the axis. An extension tube is coupled to the rotary head. The extension tube has an end portion and defines a counterbore. A blade mechanism is configured to be received in the end portion and seated on the counterbore. The blade mechanism has a body defining a substantially circular bore and a blade member extending radially inwardly from the bore.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
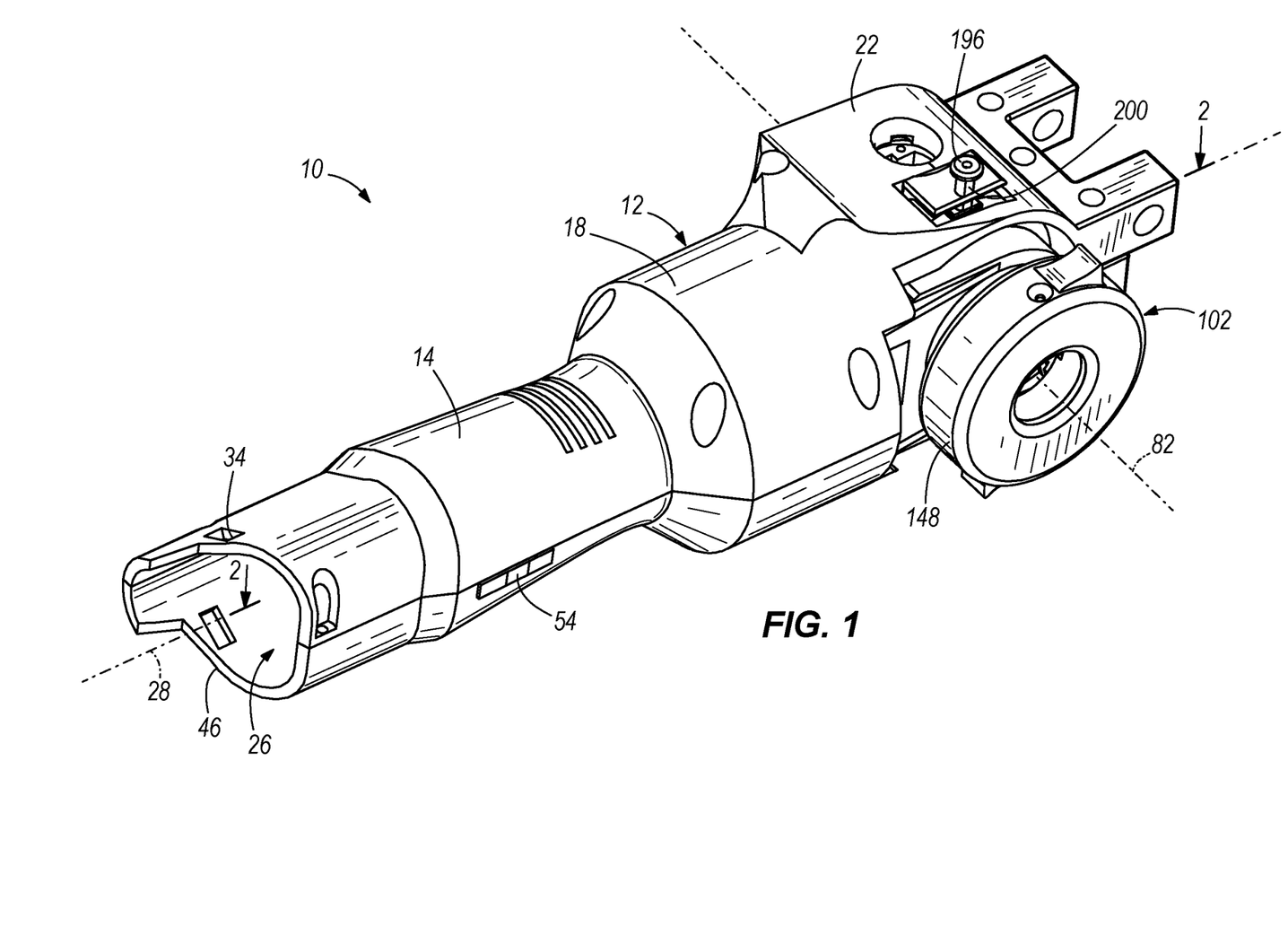
FIG. 1 is a perspective view of a wire stripper according to one construction of the invention.
Figure 2:
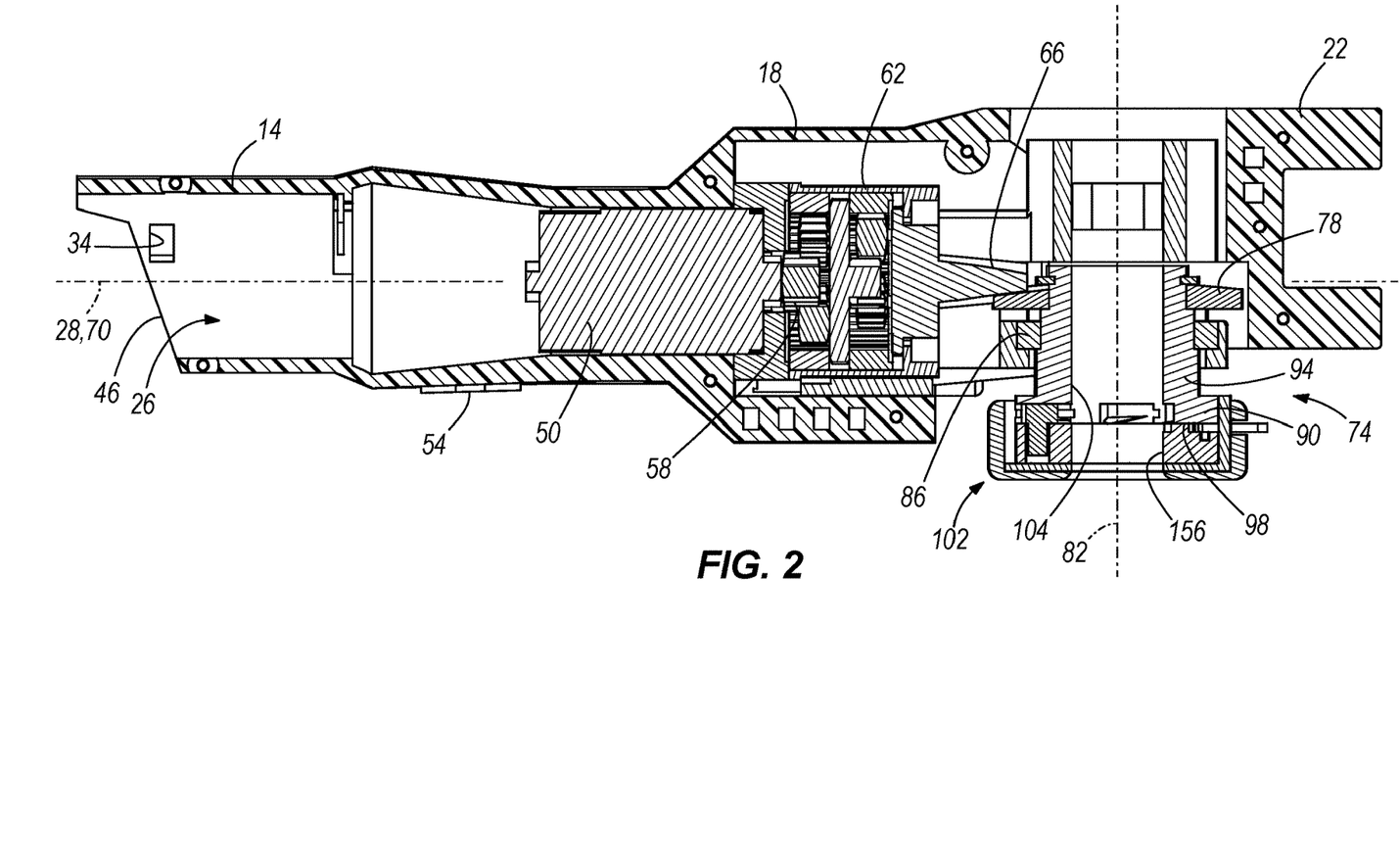
FIG. 2 is a cross-sectional view along line 2-2 of the wire stripper of FIG. 1.
Figure 7:
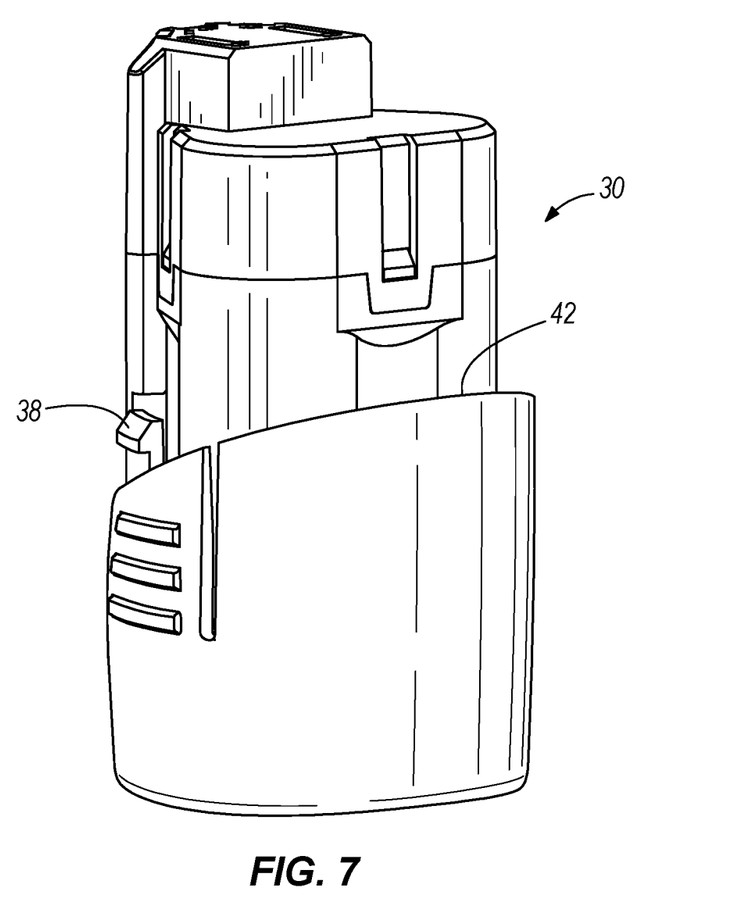
FIG. 7 is a perspective view of a battery for use with the wire stripper of FIG. 1.

FIG. 1 illustrates a power tool, more specifically, a wire stripper 10. The wire stripper 10 includes a housing assembly 12 having a handle portion 14, a drive train portion 18, and a head portion 22. With reference to FIGS. 1 and 2, the handle portion 14 defines a battery receptacle 26 for receiving a battery or battery pack along an insertion axis 28. The battery receptacle 26 may be configured to receive, for example, a 12 volt, lithium-ion rechargeable battery 30 such as that illustrated in FIG. 7. The handle portion 14 illustrated in FIGS. 1 and 2 defines battery latch apertures 34 for receiving resilient battery latch members 38 of the battery 30, thereby securing the battery 30 to the handle portion 14. The battery 30 illustrated in FIG. 7 includes a base portion 42 contoured to matingly engage corresponding contours of an end portion 46 of the housing handle portion 14 of FIGS. 1-2.

With reference to FIG. 2, a motor 50 is disposed within the drive train portion 18 and positioned adjacent the battery receptacle 26. In the illustrated construction, the motor 50 is selectively powered by the battery 30 via a switch 54 (FIGS. 1-2) coupled to the handle portion 14 and positioned adjacent the drive train portion 18. The switch 54 may be a three position switch, with an OFF position, a FORWARD ON position, and a REVERSE ON position, where FORWARD and REVERSE refer to relative directions of rotation of a motor shaft 58 (FIG. 2) of the motor 50.

Referring to FIG. 2, the motor shaft 58 extends into a gearbox 62, whereby the gearbox 62 is also disposed within the drive train portion 18 of the housing assembly 12. In the illustrated construction, the gearbox 62 includes a two-stage planetary gear arrangement. The planetary gear arrangement is coupled to a bevel gear 66. The motor shaft 58, gearbox 62, and bevel gear 66 are disposed along a common driveline axis 70. In the illustrated construction, the driveline axis 70 is substantially aligned with the battery insertion axis 28, though in other constructions separate axes may exist.

The bevel gear 66 is drivingly coupled to a rotary head 74 disposed within the head portion 22 of the housing assembly 12. More specifically, the bevel gear 66 is meshingly coupled with a gear plate 78 of the rotary head 74 for drivingly rotating the rotary head 74 about a wire insertion axis 82. The rotary head 74 is rotatably coupled to the housing assembly 12 about the wire insertion axis 82 by a bearing assembly 86. In the illustrated construction, the wire insertion axis 82 is substantially perpendicular to the driveline axis 70. In other constructions of the invention, the wire insertion axis may be aligned with the driveline axis 70, or positioned at other angles.

The rotary head 74 further includes an extension tube 90. A first end 94 of the extension tube 90 is coupled to the gear plate 78. A second end 98 of the extension tube 90 is coupled to a cutting head 102. The extension tube 90 defines a central, cylindrical aperture 104 disposed along the wire insertion axis 82 for receiving a length of a wire or cable to be stripped.

Figure 3:
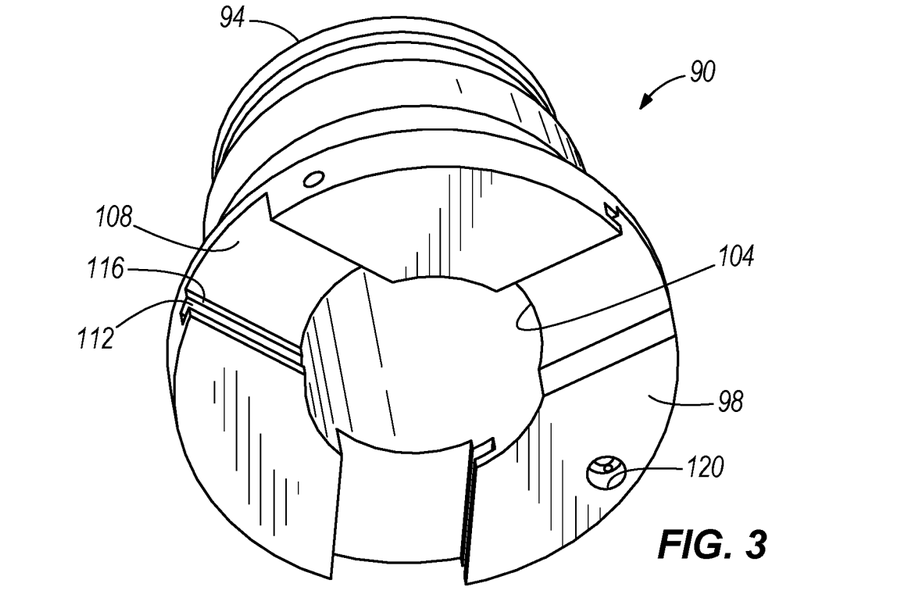
FIG. 3 is a bottom perspective of an extension tube of the wire stripper of FIG. 1.

FIG. 3 is a perspective view of the second end 98 of the extension tube 90. The second end 98 of the extension tube 90 defines three circumferentially spaced, radially aligned primary slots 108. A secondary slot 112 is defined in a sidewall 116 of each primary slot 108. The second end 98 further defines a ratchet pawl pivot aperture 120.

Figure 4:
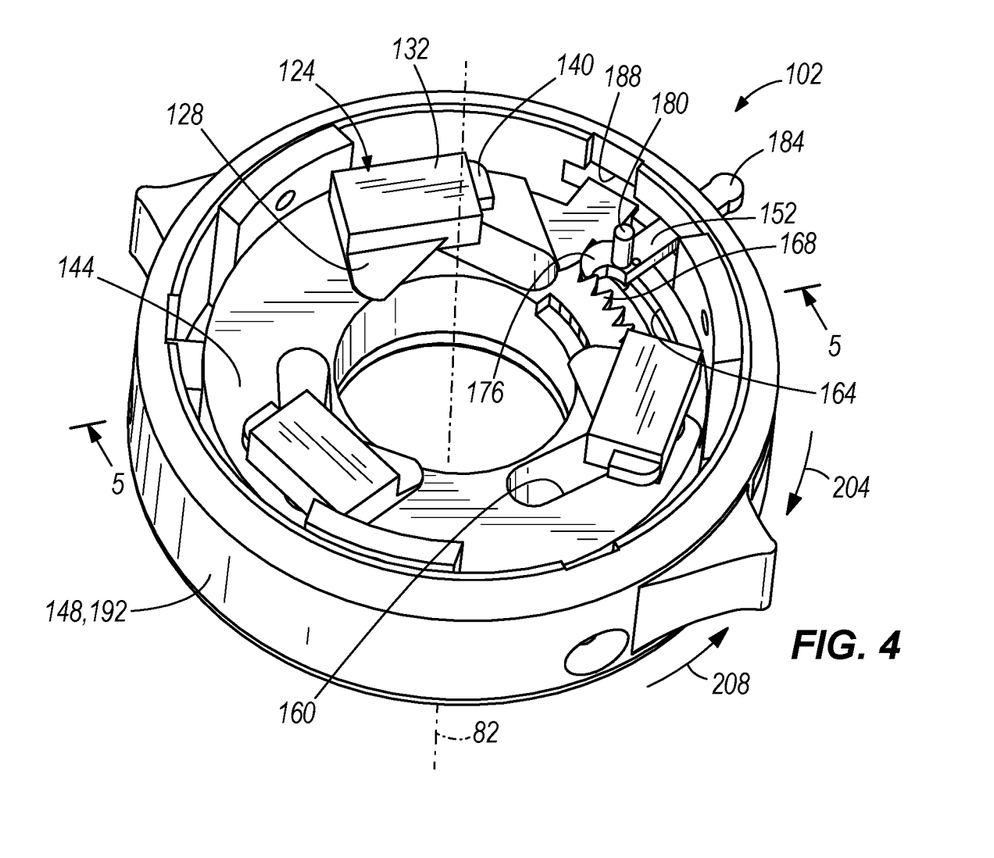
FIG. 4 is a perspective view of a cutting head assembly of the wire stripper of FIG. 1.
Figure 6:
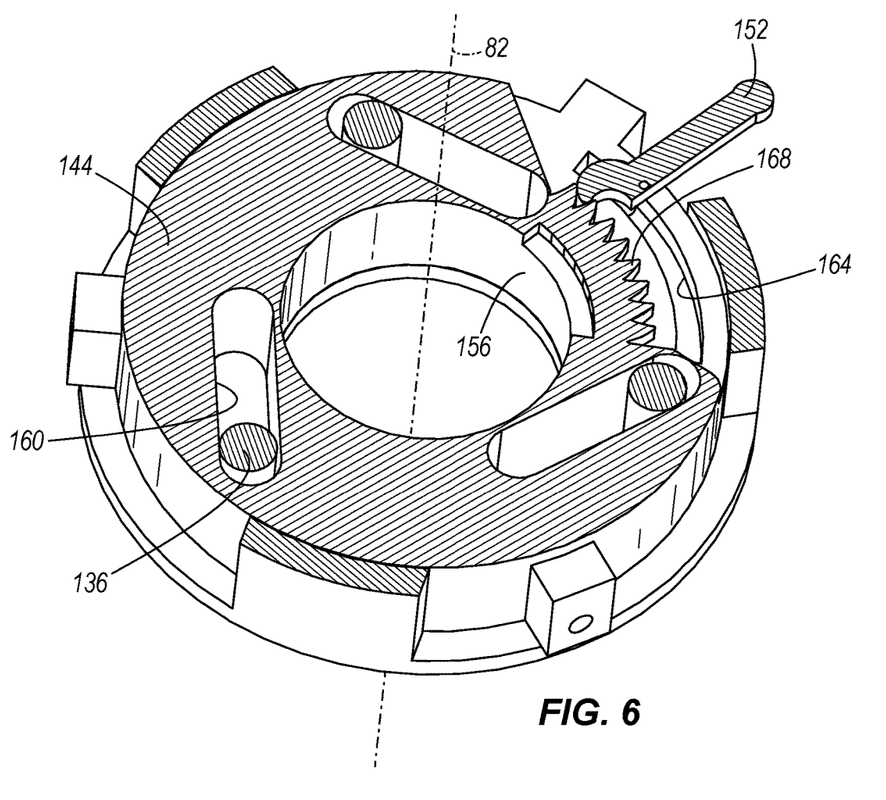
FIG. 6 is a perspective view of a sectional portion of the cutting head assembly of FIG. 4.

With reference to FIG. 4, the cutting head 102 includes three blade assemblies 124 arranged circumferentially about the wire insertion axis 82. Each blade assembly 124 includes a blade portion 128, a block portion 132, and, as shown in FIG. 6, a pin member 136. Each block portion includes a guide extension 140. Each blade assembly 124 may be unitarily formed as a single component, or the blade portion 128, block portion 132, and pin member 136 may be separately formed.

The cutting head 102 further comprises a blade carrier plate 144, a cutting head cover 148, and a ratchet pawl 152. The blade carrier plate 144 defines a central aperture 156 that is substantially aligned with the cylindrical aperture 104 of the extension tube 90, as shown in FIG. 2, along the wire insertion axis 82. The blade carrier plate 144 defines three elongate slots 160. Each slot 160 is oriented non-radially relative to the wire insertion axis 82 and substantially tangential to the central aperture 156. The elongate slots 160 are dimensioned to slidably receive the pin member 136 of the respective blade assembly 124. Thus, each blade assembly 124 is slidably coupled to the blade carrier plate 144. The blade carrier plate 144 further defines an arcuate slot 164 and gear teeth 168 disposed adjacent the arcuate slot 164.

Figure 5:
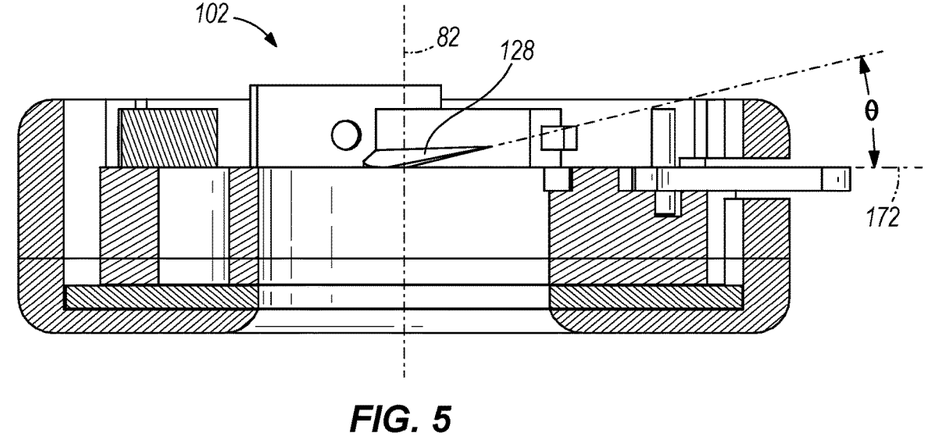
FIG. 5 is a sectional view along line 5-5 of the cutting head assembly of FIG. 4.

With reference to FIG. 5, each blade portion 128 has a pitch angle $\ominus$ defined relative to a plane 172 that is perpendicular to the wire insertion axis 82.

Referring to FIG. 4, the ratchet pawl 152 includes a pawl finger 176, a cross pin 180, and an actuating extension 184. The pawl finger 176 is configured for selective, one-way locking engagement within the gear teeth 168 of the blade carrier plate 144. The cross pin 180 is dimensioned for sliding engagement within the arcuate slot 164 of the blade carrier plate 144 and pivotal engagement with the ratchet pawl pivot aperture 120 (FIG. 3). Therefore, the ratchet pawl 152 maintains a circumferential position relative to the extension tube 90 and is circumferentially movable relative to the blade carrier plate 144. The actuating extension 184 is provided for user actuation of the ratchet pawl 152 to selectively disengage the pawl finger 176 from the gear teeth 168.

With continued reference to FIG. 4, the cutting head cover 148 is coupled to the blade carrier plate 144 and surrounds the circumference of the blade carrier plate 144. A slot 188 is defined in an outer circumferential wall 192 of the blade carrier plate, which serves as a pass-through for the actuating extension 184 of the ratchet pawl 152.

Referring to FIG. 1, a rotary lock 196 is provided on the head portion 22 of the housing assembly 12. The rotary lock 196 includes a plunger 200 that is user-engageable with the rotary head 74. When a user pushes the plunger 200 into engagement with a portion of the rotary head 74, such as the gear plate 78, rotation of the rotary head 74 relative to the housing assembly 12 is inhibited. The rotary lock 196 facilitates rotation of the cutting head 102 relative to the extension tube 90.

A combination of features described with respect to the cutting head 102 and extension tube 90 provide for radial position adjustment of the blade assemblies 124 relative to the wire insertion axis 82, thereby allowing for stripping wire or cable in a range of sizes or gauges. With simultaneous reference to FIGS. 2 and 3, the block portions 132 of each blade assembly 124 are circumferentially captured and radially slidable within the radially aligned primary slots 108 of the extension tube 90. The guide extension 140 of each block portion 132 is slidably disposed within the secondary slots 112 of the extension tube 90. Thus, each blade assembly 124 is radially slidable within the extension tube 90 and with respect to the axis 82.

Simultaneously, and with reference to FIG. 4, each blade assembly 124 is slidably coupled to the respective elongate slot 160 of the blade carrier plate 144 within the cutting head 102. When the cutting head 102 is user-rotated about the wire insertion axis 82 relative to the extension tube 90 (i.e., with the user holding the extension tube 90 in position with the rotary lock 196), the blade assemblies 124 slide within the respective elongate slots 160 while repositioning radially within the primary and secondary slots 108, 112 of the extension tube 90. When the cutting head 102 is rotated in a first direction 204, the elongate slots 160 cause the blade assemblies 124 to reposition radially outward. When the cutting head 102 is rotated in a second direction 208, the elongate slots 160 cause the blade assemblies 124 to reposition radially inward. Due to the non-radial orientation of the elongate slots 160, the radial position of the blade assemblies 124 is maintained so long as the circumferential position of the blade carrier plate 144 is maintained relative to the extension tube 90.

A selected circumferential position of the blade carrier plate 144 relative to the extension tube 90 (and therefore a selected radial position of the blade assemblies 124) is maintained by the ratchet pawl 152 engaging the gear teeth 168 of the blade carrier plate 144. When the cutting head 102 is rotated relative to the extension tube 90 in the first direction 204, the ratchet pawl finger 176 is indexed to the next gear tooth 168 without user actuation of the actuating extension 184. In order to rotate the cutting head 102 in the second direction 208, a user releases the pawl finger 176 from the gear teeth 168 with the actuating extension 184.

During operation, a user inserts a wire into the rotary head 74 along the wire insertion axis 82. With the rotary lock 196 engaged, the user rotates the cutting head 102 until the blade portions 128 penetrate the wire insulation. After releasing the rotary lock 196, the user moves the power switch 54 to the FORWARD ON position. Power supplied by the battery 30 (FIG. 7) causes the motor 50 to rotate in the forward direction, resulting in rotation of the entire rotary head 74. The pitch angle ⊖ of the blade portions 128 causes the wire to be fed into rotary head 74 along the wire insertion axis 82, while the blade portions 128 cut a continuous, helical path through the insulation. When the user determines that a sufficient portion of the wire insulation has been cut, the switch 54 is moved to the OFF position. To remove the wire, the switch 54 is moved to the REVERSE ON position, thereby driving the wire out of the rotary head 74 along the wire insertion axis 82. Alternatively, the wire may be manually removed by first engaging the rotary lock 196, actuating the ratchet actuating extension 184, and rotating the cutting head 102 to move the blade portions 128 outwardly radially out of engagement with the wire.

In one construction, the wire stripper 10 described herein may accommodate wire diameters of between approximately 19 millimeters and approximately 24 millimeters.

Figure 8:
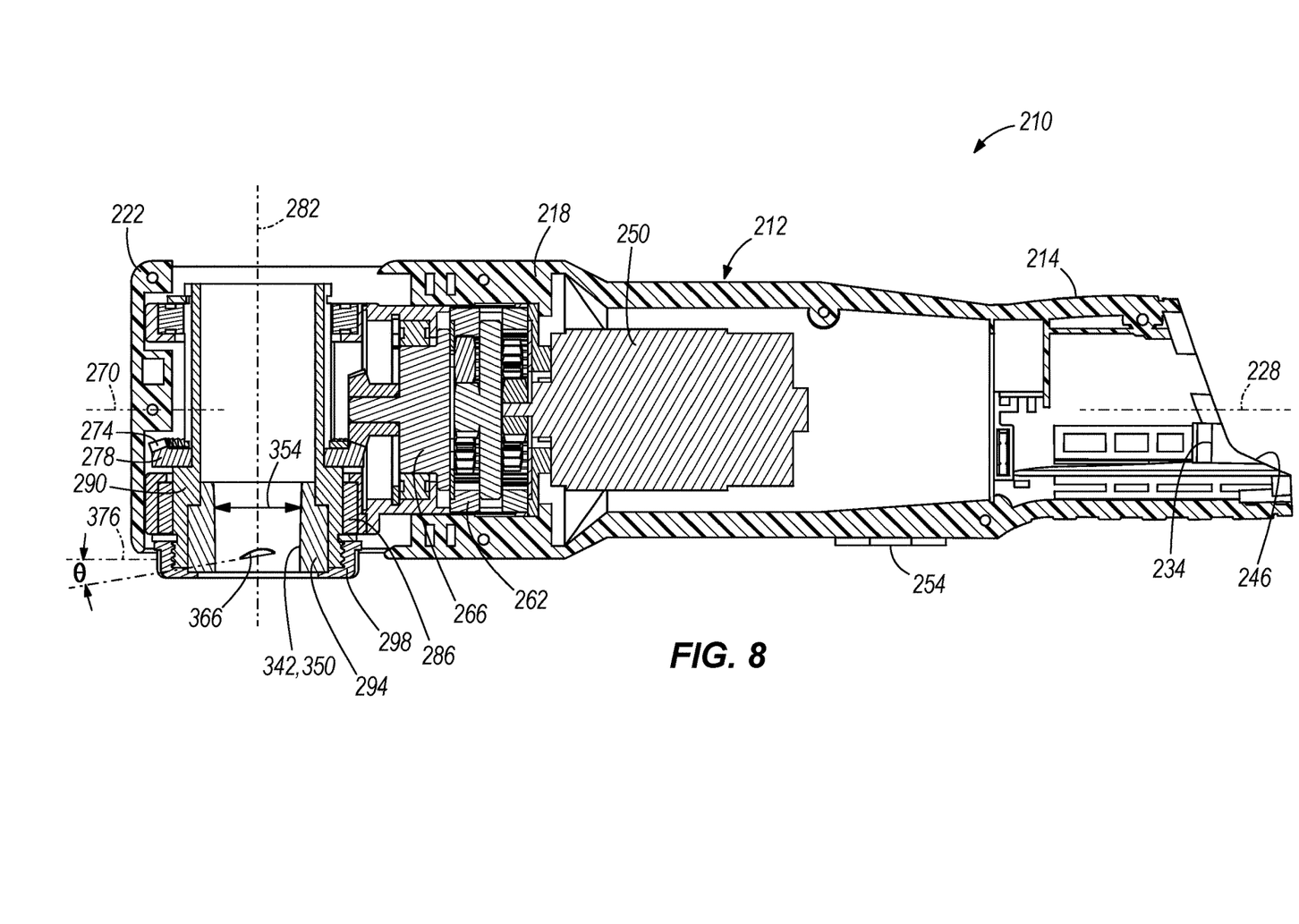
FIG. 8 is a cross sectional view of a wire stripper according to another construction of the invention.
Figure 9:
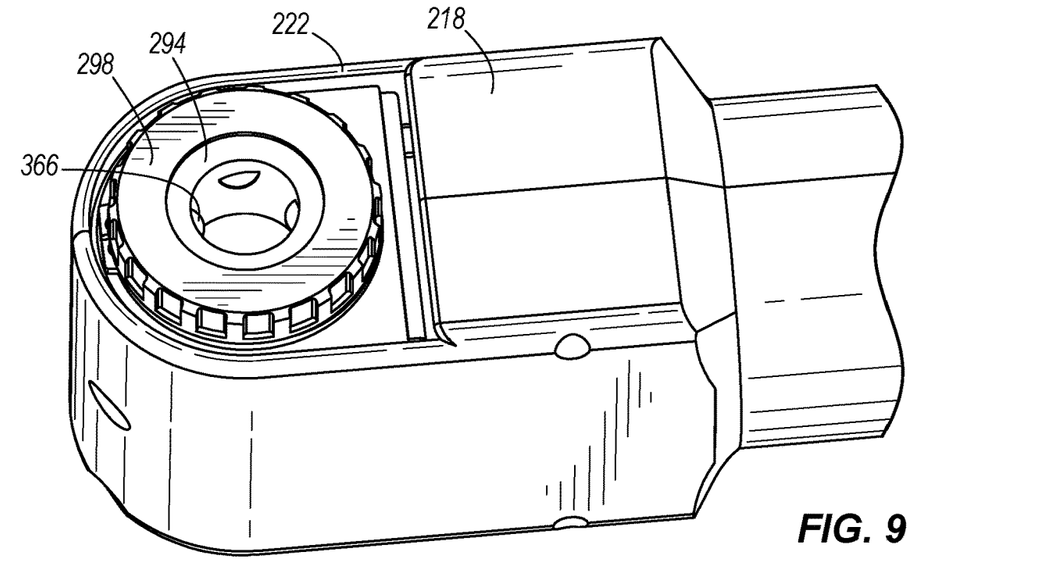
FIG. 9 is a perspective view of a head portion of the wire stripper of FIG. 8.

FIG. 8 illustrates a power tool, and more specifically a wire stripper 210 according to another construction of the invention. The wire stripper 210 includes a housing assembly 212 having a handle portion 214, a drive train portion 218, and a head portion 222. The handle portion 214 defines a battery receptacle 226 for receiving a battery or battery pack along an insertion axis 228. The battery receptacle 226 may be configured to receive, for example, a 12 volt, lithium-ion rechargeable battery 30 such as that illustrated in FIG. 7. The handle portion 214 illustrated in FIG. 8 defines battery latch apertures 234 for receiving resilient battery latch members 38 of the battery 30, thereby securing the battery 30 to the handle portion 214. The battery 30 illustrated in FIG. 7 includes the base portion 42 that is contoured to matingly engage corresponding contours of an end portion 246 of the housing handle portion 214 of FIG. 8.

A motor 250 is disposed within the drive train portion 218 and positioned adjacent the battery receptacle 226. In the illustrated construction, the motor 250 is selectively powered by the battery 230 via a switch 254 coupled to the handle portion 214 and positioned adjacent the drive train portion 218. The switch 254 may be a three position switch, with an OFF position, a FORWARD ON position, and a REVERSE ON position, where FORWARD and REVERSE refer to relative directions of rotation of a motor shaft 258 of the motor 250.

The motor shaft 258 extends into a gearbox 262, whereby the gearbox 262 is also disposed within the drive train portion 218 of the housing assembly 212. In the illustrated construction, the gearbox 262 includes a two-stage planetary gear arrangement. The planetary gear arrangement is coupled to a bevel gear 266. The motor shaft 258, gearbox 262, and bevel gear 266 are disposed along a common driveline axis 270. In the illustrated construction, the driveline axis 270 is substantially aligned with the battery insertion axis 228, though in other constructions separate axes may exist.

The bevel gear 266 is drivingly coupled to a rotary head 274 disposed within the head portion 222 of the housing assembly 212. More specifically, the bevel gear 266 is meshingly coupled to a gear plate 278 of the rotary head 274 for drivingly rotating the rotary head 274 about a wire insertion axis 282. The rotary head 274 is rotatably coupled to the housing assembly 212 about the wire insertion axis 282 by a bearing assembly 286. In the illustrated construction, the wire insertion axis 282 is substantially perpendicular to the driveline axis 270. In other constructions of the invention, the wire insertion axis 282 may be aligned with the driveline axis 270 or positions at another angle.

Figure 10:
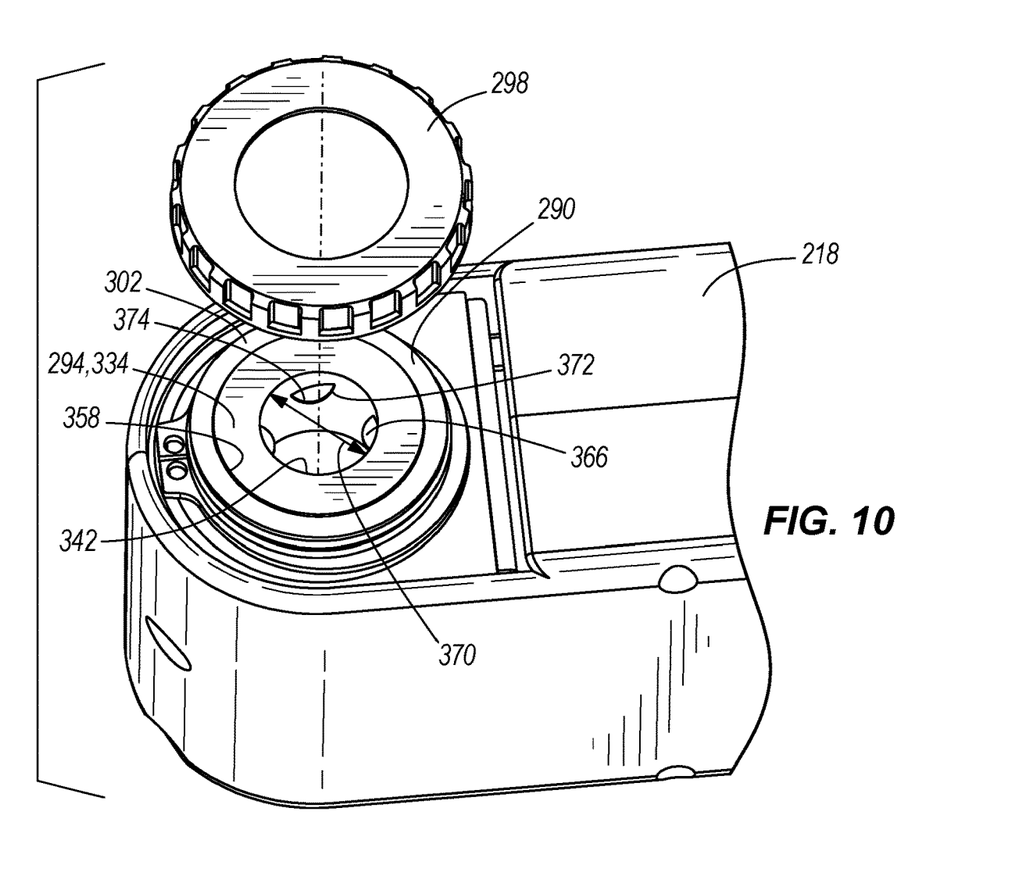
FIG. 10 is a perspective view of the head portion of the wire stripper of FIG. 9 with a retaining nut detached.
Figure 11:
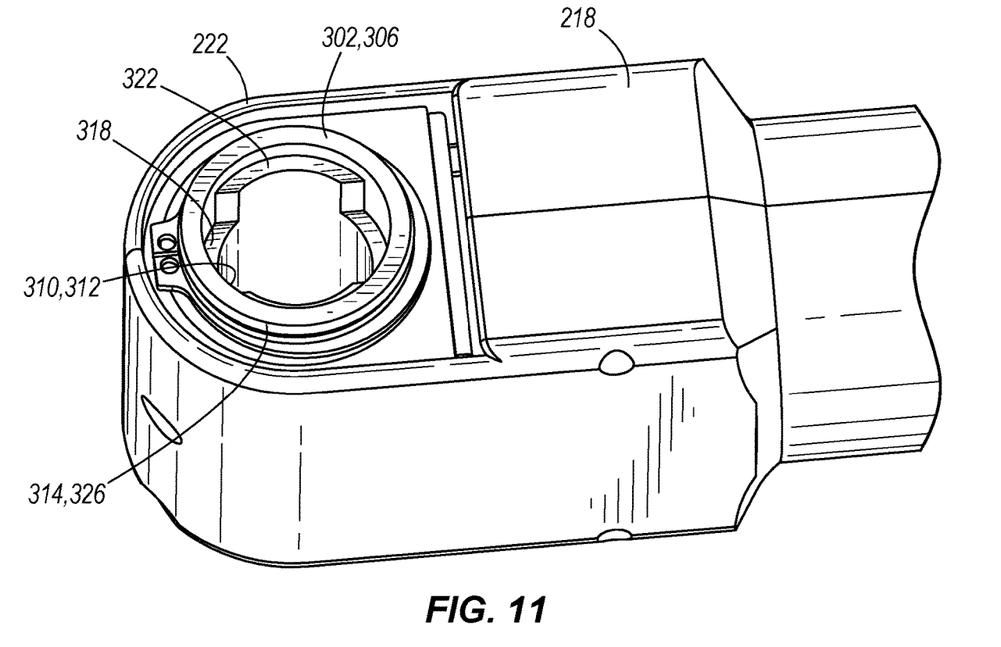
FIG. 11 is a perspective view of the head portion of the wire stripper of FIG. 10 with a blade assembly and the retaining nut detached.

With reference to FIGS. 8-13, the rotary head 274 further includes an extension tube 290, an interchangeable blade assembly 294, and a retaining nut 298. The extension tube 290 is coupled to the gear plate 278. With reference to FIG. 11 an end portion 302 of the extension tube 290 is configured to receive the blade assembly 294. The extension tube 290 includes a cylindrical wall 306 having an inner surface 310 defining a bore 312 and an outer surface 314. A pair of circumferentially-opposed notches 318 are defined in the wall 306, extending radially outward from the inner surface 310. The end portion 302 of the extension tube 290 further defines a counterbore 322. Adjacent the end portion 302, the outer surface 314 defines external threads 326.

Figure 12:
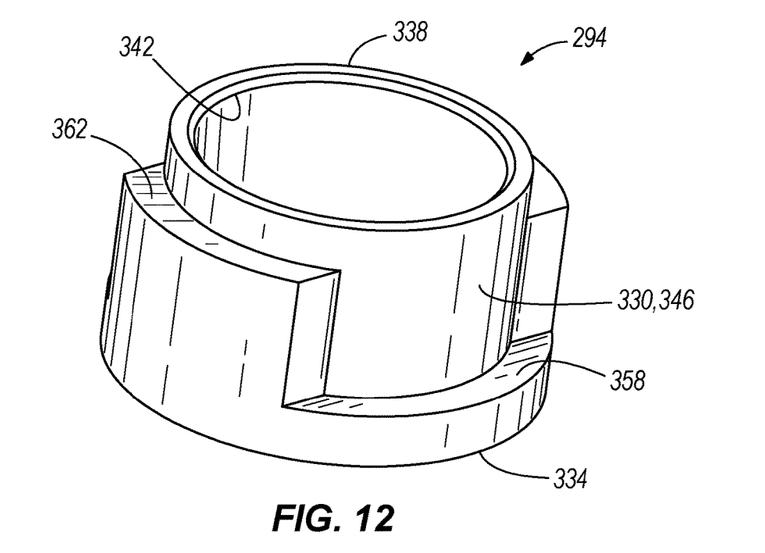
FIG. 12 is a perspective view of the blade assembly of FIG. 11.

With reference to FIG. 12, the blade assembly 294 includes a substantially cylindrical body 330, with a first end 334, a second end 338, an inner surface 342 and an outer surface 346. The inner surface 342 defines a bore 350 with a bore diameter 354 (FIG. 8). Referring to FIG. 8, the outer surface 346 defines a lip 358 disposed at the first end 334, and a pair of circumferentially-opposed, radially-extending teeth 362. The teeth 362 are dimensioned to mate with the notches 318 (FIG. 11) of the extension tube 290, such that the blade assembly 294 rotates substantially synchronously with extension tube 290 when disposed within the inner surface 310 of the extension tube 290. Similarly, and as illustrated in FIG. 10, the lip 358 is dimensioned to sit within the counterbore 322 of the extension tube 290, such that the first end 334 of the blade assembly 294 is substantially flush with, or extends slightly beyond, the end portion 302 of the extension tube 290.

As also illustrated in FIG. 10, four inwardly radially extending blade members 366 are coupled to the inner surface 342 of the cylindrical body 330, adjacent the first end 334. The four blade members 366 are circumferentially arranged such that a cutting minimum cutting diameter 370 is defined. Each of the blade members 366 has a rounded leading edge 372 and a trailing edge 374, in order to facilitate bi-directional cutting. As shown in FIG. 8, each blade member 366 has a pitch angle ⊖ defined relative to a plane 376 that is generally perpendicular to the wire insertion axis 282. The blade members 366 may be integrally formed as one with the blade assembly body 330, or formed separately.

Blade assemblies 294 may be offered in a variety of sizes based upon bore diameter and minimum cutting diameters for stripping wires and cables of various gauges and insulation types. A user may select a specific blade assembly 294 for a particular wire stripping application. In other embodiments, the blade members may be adjustably mounted within the cylindrical body, such that a single blade assembly can accommodate a wider range of wire gauges and insulation configurations.

Figure 13:
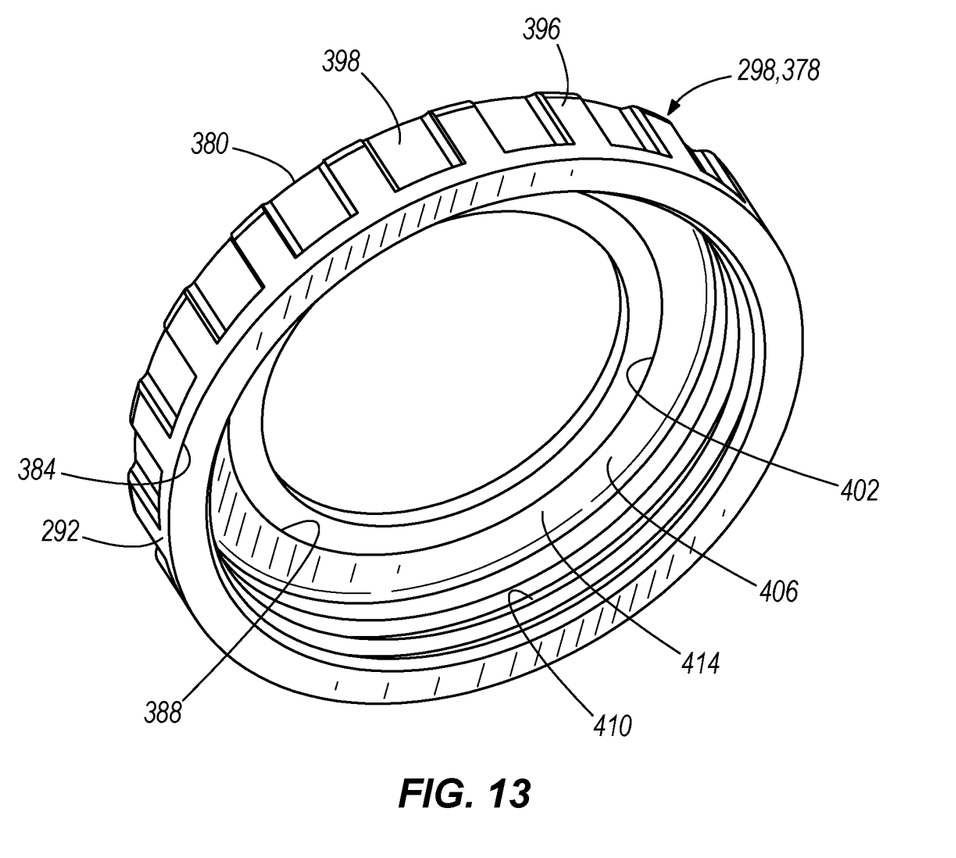
FIG. 13 is a perspective view of the retaining nut of FIG. 10.

Referring to FIG. 13, the retaining nut 298 has a ring-like body 378, with a first end 380, a second end 384, an inner surface 388 and an outer surface 392. The outer surface 392 defines a plurality of circumferentially arranged lands 396 and grooves 398. The lands 396 and grooves 398 provide a gripping surface for tool-free removal and tightening of the retaining nut 298 when exchanging blade assemblies 294. The inner surface 388 defines a wire aperture 402, a counterbore 406, and internal threads 410 disposed within the counterbore 406. The internal threads 410 are configured to engage the external threads 326 of the extension tube 290. A base wall 414 of the counterbore 406 is configured to engage the first end 334 of the blade assembly 294 when the retaining nut 298 is coupled to the extension tube 290.

During operation, a user selects a blade assembly 294 of the desired size. The retaining nut 298 is loosen and removed from the extension tube 290. The blade assembly 294 is inserted into the bore 312 of the extension tube 290, with the teeth 362 aligned with the notches 318. With the blade assembly 294 seated in the extension tube 290, the retaining nut 290 is coupled to the extension tube 290, thereby retaining the blade assembly 294 in the tool 210.

A user inserts a wire into the rotary head 274 along the wire insertion axis 282. Power supplied by the battery 230 causes the motor 250 to rotate in the forward direction, resulting in rotation of the entire rotary head 274. The pitch angle ⊖ of the blade members 366 causes the wire to be fed into rotary head 274 along the wire insertion axis 282, while the blade members 366 cut a continuous, helical path through the insulation. When the user determines that a sufficient portion of the wire insulation has been cut, the switch 254 is moved to the OFF position. To remove the wire, the switch 254 is moved to the REVERSE ON position, thereby driving the wire out of the rotary head 274 along the wire insertion axis 282.

In order to remove and exchange the blade assembly 294, the retaining nut 298 is loosened and removed from the extension tube 290. The blade assembly 294 is withdrawn from the bore 312 of the extension tube 290, and a different blade assembly 294 may be inserted in its place. During periods of non-use, the retaining nut 298 may be coupled to the extension tube 290 without a blade assembly 294, thereby disabling the wire stripper 212.

In one construction, the wire stripper 210 described herein may accommodate wire diameters of between approximately 19 millimeters and approximately 24 millimeters.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A wire stripper operable to strip insulation from a wire, the wire stripper comprising:
    a battery;
    a handle portion including a receptacle that receives the battery along a battery insertion axis;
    a motor powered by the battery, the motor located in the handle portion, the motor including a motor shaft that rotates about a driveline axis;
    a rotary head coupled to the motor for rotation by the motor about a wire insertion axis that is perpendicular to the driveline axis, the rotary head defines a central aperture, the wire insertion axis extends through the central aperture of the rotary head;
    a blade coupled to the rotary head for rotation with the rotary head about the wire insertion axis by the motor, wherein the blade extends into the central aperture to cut the insulation of the wire passing through the central aperture along the wire insertion axis as the blade rotates about the wire insertion axis;
    a cutting head coupled to the rotary head for supporting the blade, the cutting head rotatable relative to the handle and the rotary head in a first direction about the wire insertion axis to move the blade toward the wire insertion axis and rotatable relative to the handle and the rotary head in a second direction about the wire insertion axis, opposite the first direction, to move the blade away from the wire insertion axis; and
    a rotary lock, the rotary lock operable to hold the rotary head from rotation relative to the handle as the cutting head rotates in the first and the second directions about the wire insertion axis to allow the cutting head to rotate relative to the rotary head.

2. The wire stripper of claim 1, wherein the battery insertion axis is perpendicular to the wire insertion axis.

3. The wire stripper of claim 2, wherein the battery insertion axis is coaxial with the driveline axis.

4. The wire stripper of claim 1, wherein the battery insertion axis extends centrally through the handle portion.

5. The wire stripper of claim 1, wherein the driveline axis extends centrally through the handle portion.

6. The wire stripper of claim 1, wherein the handle portion surrounds the motor.

7. The wire stripper of claim 1, wherein the handle portion includes a first end and a second end opposite the first end, wherein the receptacle that receives the battery is located at the first end of the handle and the rotary head is located at the second end of the handle.

8. The wire stripper of claim 7, wherein the motor is located between the first end and the second end of the handle and the driveline axis extends through the first end and the second end of the handle.

9. The wire stripper of claim 1, wherein the handle portion includes a first end and a second end opposite the first end, wherein the motor is located between the first end and the second end of the handle and the driveline axis extends through the first end and the second end of the handle.

10. The wire stripper of claim 1, wherein the receptacle that receives the battery is perpendicular to the central aperture.

11. The wire stripper of claim 1, wherein the handle portion includes a switch, the switch operable to control the motor.

12. The wire stripper of claim 1, wherein the rotary lock holds the motor shaft from rotation about the driveline axis as the cutting head rotates in the first and the second directions.

13. The wire stripper of claim 1, wherein the motor shaft is fixed from rotation as the cutting head rotates in the first and the second directions.

14. The wire stripper of claim 1, wherein the blade is a first blade, the wire stripper further including a second blade and a third blade, wherein the cutting head is rotatable in the first direction to simultaneously move the first, the second, and the third blades toward the wire insertion axis and the cutting head is rotatable in the second direction to simultaneously move the first, the second, and the third blades away from the wire insertion axis.

15. The wire stripper of claim 14, wherein the first, the second, and the third blades are arranged circumferentially about the wire insertion axis.

16. The wire stripper of claim 1, wherein the cutting head is user-rotated in the first and the second directions.

17. The wire stripper of claim 1, wherein a pitch angle of the blade is defined relative to a plane that is generally perpendicular to the wire insertion axis, wherein the pitch angle of the blade automatically feeds the wire into the rotary head along the wire insertion axis.

\* \* \* \* \*